US012141605B2

United States Patent
Vee et al.

(10) Patent No.: US 12,141,605 B2
(45) Date of Patent: *Nov. 12, 2024

(54) SCHEDULING OPERATIONS ON A COMPUTATION GRAPH

(71) Applicant: Google LLC, Mountain View, CA (US)

(72) Inventors: Erik Nathan Vee, Hillsborough, CA (US); Manish Deepak Purohit, Fremont, CA (US); Joshua Ruizhi Wang, Mountain View, CA (US); Shanmugasundaram Ravikumar, Piedmont, CA (US); Zoya Svitkina, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,495

(22) Filed: Jul. 18, 2023

(65) Prior Publication Data
US 2024/0126596 A1    Apr. 18, 2024

Related U.S. Application Data

(63) Continuation of application No. 17/214,699, filed on Mar. 26, 2021, now Pat. No. 11,755,367, which is a
(Continued)

(51) Int. Cl.
*G06F 9/48* (2006.01)
*G06F 16/901* (2019.01)
*G06N 3/02* (2006.01)

(52) U.S. Cl.
CPC ........ *G06F 9/4881* (2013.01); *G06F 16/9024* (2019.01); *G06N 3/02* (2013.01)

(58) Field of Classification Search
CPC ...... G06F 9/4881; G06F 16/9024; G06N 3/02
See application file for complete search history.

(56) References Cited

U.S. PATENT DOCUMENTS 6,044,222 A      3/2000   Simons et al.
8,312,037 B1 *  11/2012   Bacthavachalu ..... G06F 9/4881
                                                         707/769
(Continued)

FOREIGN PATENT DOCUMENTS

CN    103164275    6/2013
CN    108292241    7/2018
(Continued)

OTHER PUBLICATIONS

Bodlaender et al., "A O(c^k n) 5-approximation algorithm for treewidth" SIAM J. Comput., 2016, 62 pages.
(Continued)

*Primary Examiner* — Benjamin C Wu
(74) *Attorney, Agent, or Firm* — Fish & Richardson P.C.

(57) ABSTRACT

Methods, systems, and apparatus, including computer programs encoded on computer storage media, for scheduling operations represented on a computation graph. One of the methods receiving, by a computation graph system, a request to generate a schedule for processing a computation graph, obtaining data representing the computation graph generating a separator of the computation graph; and generating the schedule to perform the operations represented in the computation graph, wherein generating the schedule comprises: initializing the schedule with zero nodes; for each node in the separator: determining whether the node has any predecessor nodes in the computation graph, when the node has any predecessor nodes, adding the predecessor nodes to the schedule, and adding the node in the schedule, and adding to the schedule each node in each subgraph that is not a predecessor to any node in the separator on the computation graph.

17 Claims, 8 Drawing Sheets

Related U.S. Application Data continuation of application No. 16/932,581, filed on Jul. 17, 2020, now Pat. No. 10,963,301.

(60) Provisional application No. 62/875,433, filed on Jul. 17, 2019.

(56) References Cited

U.S. PATENT DOCUMENTS

| | | | | |
|---|---|---|---|---|
| 9,218,209 | B2* | 12/2015 | Waas | G06F 9/5027 |
| 10,152,557 | B2 | 12/2018 | Banadaki | |
| 10,291,696 | B2 | 4/2019 | Ying | |
| 10,474,497 | B1 | 11/2019 | Kancharla | |
| 10,963,301 | B2* | 3/2021 | Vee | G06N 3/105 |
| 11,755,367 | B2* | 9/2023 | Vee | G06F 16/9024 |
| | | | | 718/102 |
| 2005/0212818 | A1 | 9/2005 | Hudson, Jr. | |
| 2006/0224432 | A1* | 10/2006 | Li | G06Q 10/1095 |
| | | | | 705/7.19 |
| 2007/0271381 | A1* | 11/2007 | Wholey | G06F 9/5066 |
| | | | | 709/226 |
| 2009/0234802 | A1 | 9/2009 | Shinjo | |
| 2011/0067030 | A1 | 3/2011 | Isard | |
| 2012/0110591 | A1* | 5/2012 | Ghosh | G06F 11/3604 |
| | | | | 718/104 |
| 2014/0012884 | A1 | 1/2014 | Bornea | |
| 2015/0007182 | A1* | 1/2015 | Rossbach | G06F 9/4843 |
| | | | | 718/102 |
| 2015/0178124 | A1 | 6/2015 | Modani | |
| 2015/0268992 | A1 | 9/2015 | Fan | |
| 2016/0170811 | A1* | 6/2016 | Peacock | G06F 9/52 |
| | | | | 718/106 |
| 2017/0132513 | A1 | 5/2017 | Yu et al. | |
| 2018/0247197 | A1 | 8/2018 | Tucker et al. | |
| 2018/0276040 | A1* | 9/2018 | Hosmani | G06F 9/4843 |
| 2018/0314733 | A1* | 11/2018 | Wen | G06F 16/24542 |
| 2019/0065162 | A1 | 6/2019 | Thannbidorai | |
| 2019/0278808 | A1 | 9/2019 | Xia | |
| 2019/0317804 | A1 | 10/2019 | Gong | |
| 2019/0317812 | A1 | 10/2019 | Gebara | |
| 2020/0050633 | A1 | 2/2020 | Evans | |
| 2020/0249998 | A1 | 8/2020 | Che | |
| 2020/0293838 | A1* | 9/2020 | Li | G06F 18/2185 |
| 2020/0302302 | A1 | 9/2020 | Tucker | |
| 2021/0190508 | A1 | 6/2021 | Alsharif et al. | |
| 2021/0191765 | A1* | 6/2021 | Bokam | G06F 30/20 |

FOREIGN PATENT DOCUMENTS

| | | |
|---|---|---|
| CN | 108351805 | 7/2018 |
| WO | WO 2017075438 | 5/2017 |

OTHER PUBLICATIONS

Briggs et al, "Rematerialization" ACM, 1992, 11 pages.
Chen et al., "Mxnet: A flexible and efficient machine learning library for heterogeneous distributed systems" arXiv, 2015, 6 pages.
Chen et al, "Training deep nets with sublinear memory cost" arXiv, 2016, 12 pages.
Gruslys et al, "Memory-efficient backpropagation through time" NIPS, 2016, 9 pages.
Halevy, "Answering queries using views: A survey" VLDB Journal, 2001, 25 pages.
He et al, "Deep residual learning for image recognition" Proceedings of the IEEE Conference on Computer Vision and Pattern Recognition, 2016, 9 pages.
International Preliminary Report on Patentability in International Application No. PCT/US2020/042646, dated Jan. 27, 2022, 8 pages.
International Search Report and Written Opinion in International Application No. PCT/US2020/042646, dated Nov. 16, 2020, 15 pages.
Sethi, "Complete register allocation problems" SIAM J. Comput., 1975, 14 pages.
Tang et al, "Scheduling Computation Graphs of Deep Learning Models on Manycore CPUs" arXiv, Jul. 16, 2018, 19 pages.
tensorflow.org [online], "XLA: Optimizing Compiler for Machine Learning," 2017, retrieved on Jul. 23, 2020, retrieved from URL <https://www.tensorflow.org/xla>, 8 pages.
Thorup, "All structured programs have small tree-width and good register allocation" Inf. Comput., 1998, 23 pages.
Vaswani et al, "Attention is all you need" NIPS, 2017, 15 pages.
Lu et al., "Task matching and scheduling for smart homogeneous multiprocessor systems," Journal of Systems Engineering and Electronics, Feb. 2007, 6 pages (with English abstract).
Office Action in Chinese Appln. No. 202080044760.6, mailed on Sep. 5, 2024, 17 pages (with English translation).

* cited by examiner

SCHEDULING OPERATIONS ON A COMPUTATION GRAPH

CROSS-REFERENCE TO RELATED APPLICATIONS

This is a continuation of U.S. application Ser. No. 17/214,699, filed on Mar. 26, 2021, which is a continuation of U.S. application Ser. No. 16/932,581, filed on Jul. 17, 2020 (now U.S. Pat. No. 10,963,301), which claims priority to U.S. Provisional Application No. 62/875,433, filed on Jul. 17, 2019. The disclosures of the prior applications are considered part of and are incorporated by reference in the disclosure of this application.

TECHNICAL FIELD

This specification relates to optimizing peak memory usage when executing a computation graph.

BACKGROUND

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

To allow neural networks perform better on a variety of tasks, e.g., speech, language, and vision processing tasks, neural networks are designed with larger sizes layers, larger numbers of layers, and/or increasingly complex and intricate data dependence. However, large and complex neural networks are difficult to train as the computation costs and the required memory capacity are high. To facilitate computation speed, specialized hardware such as GPUs and AI accelerators have been commonly adopted when training complex neural network models. In more and more recent neural networks, the peak memory capacity of the hardware falls short of the peak demands on the memory when training these large models, turning memory capacity into a bottleneck for the training.

SUMMARY

This specification generally describes techniques for scheduling operations of a computation graph for execution by one or more devices to optimize peak memory usage.

According to an aspect, a method of scheduling operations of a computation graph includes: receiving, by a computation graph system, a request to generate a schedule for processing a computation graph, obtaining data representing the computation graph, generating a separator of the computation graph, and generating the schedule to perform the operations represented in the computation graph. The schedule defines a sequence of operations represented by the computation graph to perform according to an ordering. The computation graph includes a plurality of nodes and directed edges, wherein each node represents a respective operation. Each directed edge from a respective first node to a respective second node represents that a second operation represented by the respective second node requires, as input, at least one output generated by performing a first operation represented by the respective first node. The separator satisfies a property that at least removing every edge linking each node in the separator to the computation graph causes the remaining nodes and edges of the computation graph to form a plurality of connected component subgraphs. Generating the schedule includes (1) initializing the schedule with zero nodes; (2) for each node in the separator, determining whether the node has any predecessor nodes in the computation graph, when the node has any predecessor nodes, adding the predecessor nodes to the schedule, and adding the node in the schedule, and (3) adding to the schedule each node in each subgraph that is neither in the separator nor a predecessor to any node in the separator on the computation graph.

The subject matter described in this specification can be implemented in particular embodiments so as to realize one or more of the following advantages.

The described system can be used to optimize the memory usage when computing directed or undirected acyclic graphs i.e., when executing the operations represented by the graphs on one or more computing devices. For example, the described techniques can be used to optimize memory usage when computing graphs for training large and complex neural networks. To optimize the memory usage when computing graphs, the system generates a schedule specifying a sequence of the operations represented in the graph in order of execution. The schedule generated by the system is efficient and decreases the peak memory usage of computing the graph by leveraging rematerialization so that only necessary operation inputs and outputs are held in memory at any given time during execution. Some implementations can be used to fit peak memory requirements when computing directed or undirected acyclic graphs to a given memory size, e.g., the memory available on a particular piece of hardware.

When generating the schedule, the system only rearranges the order of preforming each operation, decides which operation to be held in the memory, and if so, when and for how long the operation to be held. Because none of the operations represented in the graph are modified, this technique of scheduling operations avoids the risks of reducing the accuracy of final outputs of computing the graph that are present when using other techniques of reducing memory usage, such as reusing memory regions, and communicating between CPU and GPU memory.

Moreover, the schedule can be generated in a faster clock time than with conventional schedule generation techniques. The system can generate a schedule based on graph properties of the computation graph, including a treewidth of a tree decomposition output of the computation graph. The system can exploit other graph properties to further reduce the memory costs while executing a computation graph according to that schedule.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a system implemented as computer programs on one or more computers in one or more locations that schedules operations for processing an input computation graph to reduce a peak memory requirement for executing the operations. To reduce peak memory usage, the system can receive an input computation graph representing the operations and their input dependencies of other operations in the graph. Then, the system can generate a schedule representing a sequence of the operations in order of execution. The system can generate the schedule by identifying where intermediate inputs between operations can be rematerialized to reduce or outright eliminate the need to store the intermediate inputs in memory until they are needed.

A directed acyclic computation graph can represent operations for processing an input through a neural network. The neural network can be configured to receive any kind of digital data input as a network input and to generate any kind of network output, i.e., any kind of score, classification, or regression output based on the network input. For example in image classification, if the inputs to the neural network are images or features that have been extracted from images, the output generated by the neural network for a given image may be scores for each of a set of object categories, with each score representing an estimated likelihood that the image contains an image of an object belonging to the category. The neural network processes the input to generate a network output by performing a plurality of operations. Each operation can receive zero or more inputs, and can generate an output. Examples of operations that can be represented in a graph representation a neural network include an activation function, e.g., a nonlinear mapping that takes intermediate variables based on the inputs from the previous layer and generates outputs for the next layer, a forward gradient propagation operation, e.g., operations relating to the calculations and storage of intermediate variables of each layer and outputs for the neural network in order from the first input layer to the output layer, a backward gradient propagation operations, e.g., operations related to calculations and storage of gradients of a loss function with respect to parameters of each layer in the neural network from the output layer to the first input layer and an optimization operation, e.g., operations used by optimizers such as (stochastic) gradient descent, momentum, RMSProp and Adam, to assist in updating the parameters of the neural network based on computed gradients of the loss function. The inputs to and output of any given operation can be, for example, a scalar value, a categorical value, a vector, a matrix, or a higher-order tensor.

Figure 1:
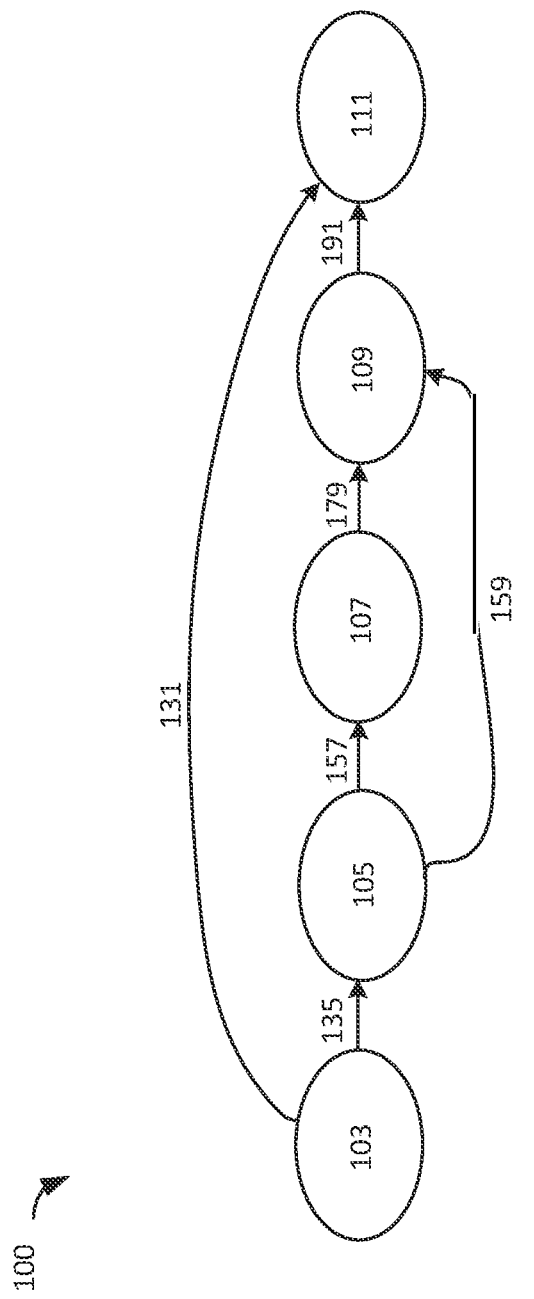
FIG. 1 shows the scheduling of an example of an example directed acyclic computation graph.

FIG. 1 shows the scheduling of an example directed acyclic computation graph 100. As shown in FIG. 1, a plurality of operations can be represented as a directed acyclic computation graph 100 having a plurality of nodes (103, 105, 107, 109 and 111) and edges (135, 157, 179, 191, 131 and 159). Each node of the computation graph represents a respective operation of the plurality of operations. Each node consumes a set of inputs from its incoming edge(s), performs its respective operation on the inputs and outputs the operation results to any node that is connected to the node by an outbound edge. For example, the node 105 takes the output of node 103 operation via an incoming edge 135 as an input, performs its respective operation, and sends an output via two outbound edges 157 and 159 as an input for nodes 107 and 109, respectively. Normally, both inputs and outputs of the computation graph should be stored in memory during the entire computation, and the order in which the nodes are computed, i.e., the schedule, will determine the peak memory usage. As shown in FIG. 1, when storing the output of each node occupies one unit of memory, computing the nodes in the order {103, 105, 107, 109, 111} would need four units of memory, whereas computing them in the order {103, 105, 107, 109, 103, 111} would only need three units of memory. The latter order here involves rematerializing the output of node 103, i.e., generating the output of node 103 again before it is required as input to another node instead of always keeping it in memory. The combination of ordering the executions of operations and possibly rematerializing some intermediate nodes is referred as a schedule in this specification.

Figure 2:
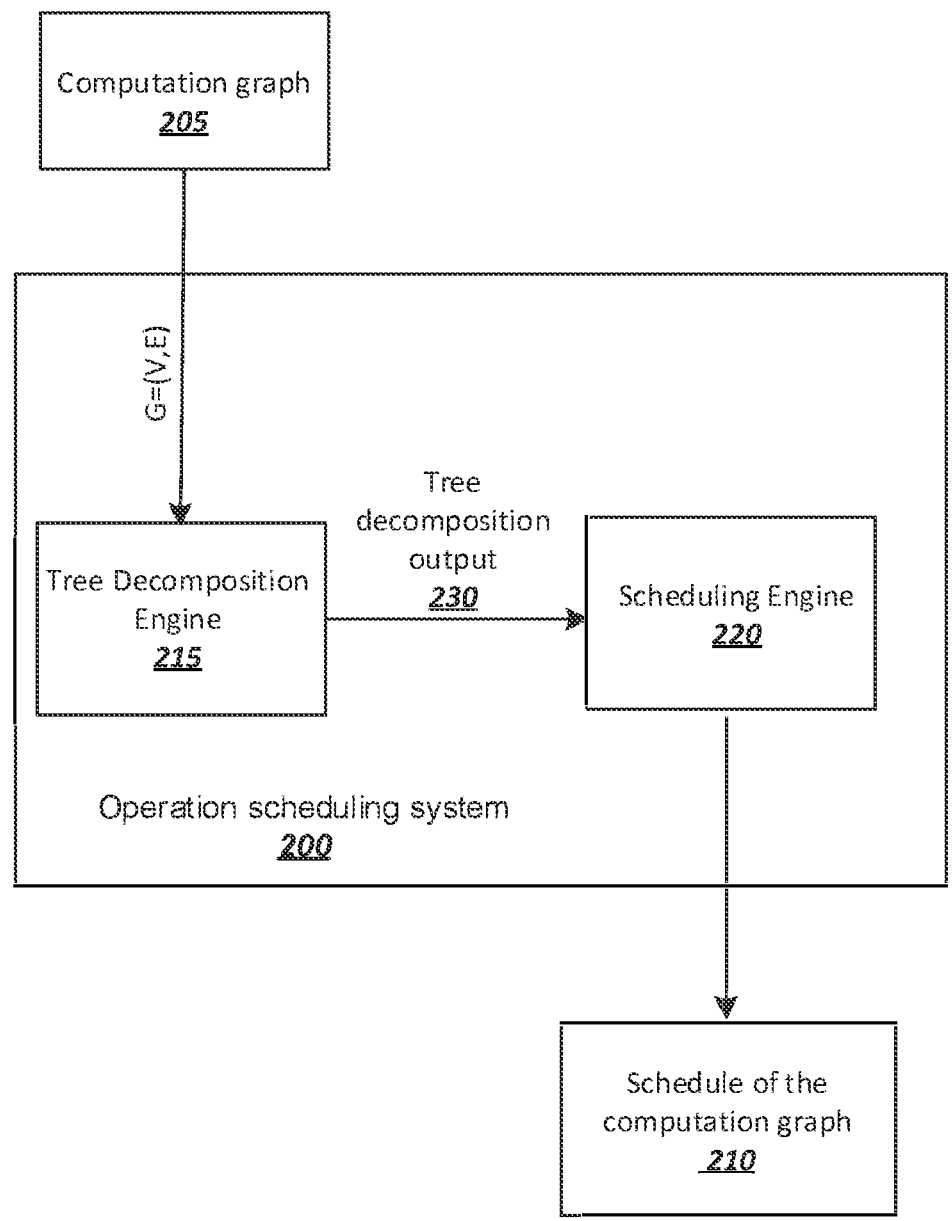
FIG. 2 is a schematic plot of an example operation scheduling system.

FIG. 2 shows an example operation scheduling system 200 including a tree decomposition engine 215 and a scheduling engine 220.

The operation scheduling system 200 is implemented as computer programs on one or more computers in one or more locations in which the systems, components, and techniques described below are implemented.

The operation scheduling system 200 can take a computation graph 205, e.g., a directed, acyclic graph, as an input. The computation graph 205 can be directed acyclic.

The tree decomposition engine 215 takes an input the input computation graph 205 and performs a tree decomposition process to generate a tree decomposition output 230 of (1) a plurality of sets that each comprise one or more nodes of the computation graph 205 and (2) directed paths connecting each set of the plurality of sets. For short, the node sets in (1) can be referred to as "bags," and the directed paths in (2) as a "tree." Note here each computation graph can have a plurality of different possible tree decompositions by applying one or more decomposition processes on the graph.

The scheduling engine 220 takes as input the original computation graph 205 and the tree decomposition output 230 and outputs a schedule 210 for the computation graph 205.

More specifically, a directed acyclic computation graph can be represented by G=(V,E), where V is a node set including all the nodes of the computation graph G, and E is an edge set including all the directed edges of the computation graph G. For any two nodes u and v in the node set V, a directed edge (u, v) represents a data dependency either from u to v. A data dependency from u to v means the operation represented by node u generates an output that is input to the operation represented by node v. Therefore, the node-u operation must be performed before performing the node-v operation.

Additionally, one or some of the nodes are designated as a set of final nodes f. The nodes in f are required to be held in memory at the end of the computation of the computation graph, e.g., because the output of the nodes in f is the output of the machine learning model represented by the computation graph. In this specification, we assume these dummy nodes to be out-degree zero, i.e., the output of each node in the node set f will not be used by any other node in the same graph.

A schedule for a computation graph is a sequence of nodes belonging to V with the following properties: (1) the final node set f is represented in the schedule, and (2) each node in the schedule occurs only after all of its predecessors have been added to the schedule at least once. For a directed edge (u, v), the predecessor for the node v is the node u that is connected by an outgoing path in the computation graph from u to v. The second requirement prevents the schedule from including a node in a schedule before scheduling all the other nodes in the computation graph that the node has a data dependency with. If a predecessor node for a node has one or more predecessors of its own, then those predecessor nodes appear in the schedule before the predecessor node, and so on until reaching a node without predecessors, e.g., an input node receiving the input for the computation graph.

In addition, a node can appear in a schedule more than once. As described below, the system can generate a schedule that can add the same node to a schedule more than once, trading additional computation time for a reduced memory requirement to execute the computation graph.

A schedule naturally implies time and memory bounds for computing the graph G. The length of a node includes the time required to execute the corresponding operation of the node, and the length of a schedule is the sum of the length of each node in the schedule of the computation graph G. Thus, the lower bound of the length of the schedule is the time required to execute every operation of the computation graph G once.

The peak memory usage of a schedule is defined through the maximum memory required at any given time step while executing the graph according to the schedule. The maximum memory required at a time step is defined by summing up the size of the tensor outputs by all immediate predecessors of a node at a time step. Therefore, the set of tensors that needs to be held in memory at the time step depends on the current node, each predecessor for the current node, and all predecessors for each predecessor for the current node.

The computation graph G can be decomposed into (1) a plurality of sets that each comprise one or more nodes of the computation graph (a plurality of bags) and (2) paths connecting each set of the plurality of sets (a tree). Each bag is a subset of nodes in the computation graph, and the tree is a tree structure connecting all bags. A tree is a type of undirected acyclic computation graph in which any two nodes are connectedly by exactly one edge, or equivalently, each node at most has one most recent predecessor. The decomposition is called a tree decomposition, which satisfies the following three properties: (1) each node in the original computation graph G is in at least one of the bags, (2) for each directed edge (u, v) in the original computation graph, both nodes of the edge show up together in at least one bag (3) for each node in the original computation graph, bags containing the same node(s) form a connected subgraph of the tree. In other words, a node can be assigned to more than one bag, and all of the bags that contain a given node must form a connected subgraph of the tree. Each of the connected subgraph can be viewed as a subtree.

Figure 3C:
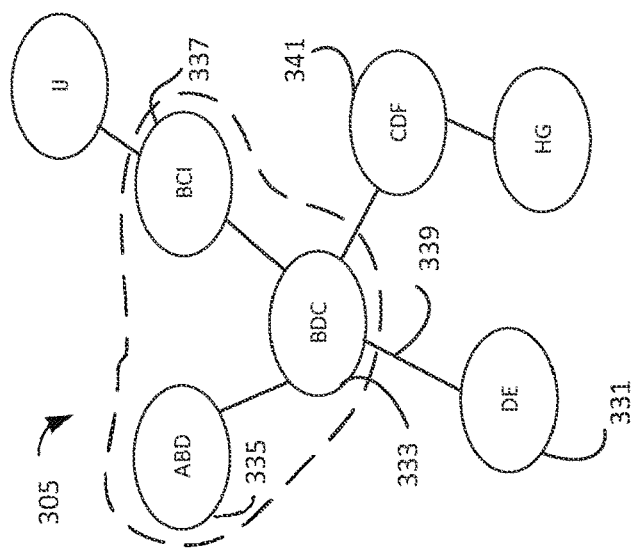
FIG. 3C is an example tree decomposition of the undirected counterpart in FIG. 3B.
Figure 3B:
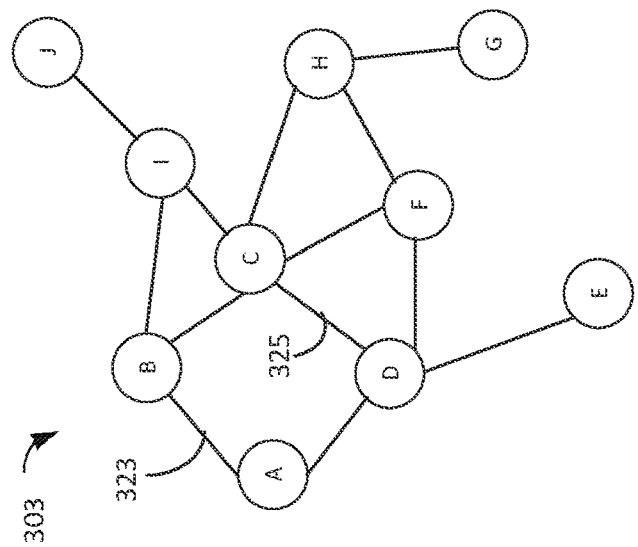
FIG. 3B is an example undirected counterpart to the computation graph in FIG. 3A.
Figure 3A:
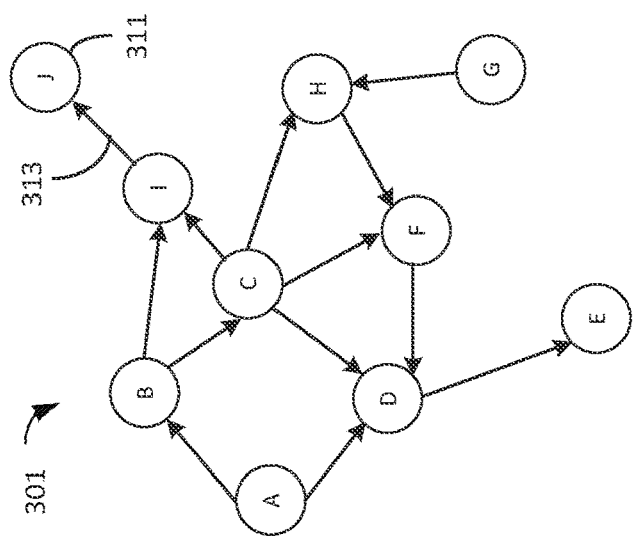
FIG. 3A is an example of a directed, acyclic computation graph.

As shown in FIG. 3A, a directed, acyclic computation graph 301 has nodes A to J, and the edge 313 is directed as the node I is a predecessor for the node J (311). In some implementations, prior to performing a tree decomposition, the system transforms the directed computation graph to an undirected computation graph by removing the direction of the edges in the computation graph 301. As shown in FIG. 3B, each edge of all the edges in an undirected computation graph 303 based on computation graph 301 has no direction. FIG. 3C shows an example tree decomposition output 305 of the undirected computation graph 303, with the tree decomposition output being (1) a plurality of bags and (2) a tree connecting the bags. The tree decomposition output 305 satisfies the 3 properties of a tree decomposition:

(1) Each node in the original undirected computation graph 303 is in at least one bag. For example, node D is in bags 331, 333 and 335. For another example, node B is in bags 333, 335 and 337.

(2) For every edge in the computation graph 303, the two end nodes of the edge are assigned to the same bag at least once in the tree decomposition. For example, the edge 323 in the computation graph 303 has two end nodes A and B, now in the tree decomposition output 305, both nodes A and B are in the bag 335 together. For another example, the edge 325 in the computation graph 303 connects two end notes C and D, thus in the tree decomposition output 305, both nodes C and D show up in the bag 333 and the bag 341.

(3) For any node that is assigned to more than one bag, all the bags that contain the node can form a subtree. For example, bags 333, 335 and 337 contain the node B simultaneously, and the bags 333, 335 and 337 and the edges connecting the bags can together form up a connected component subgraph of tree decomposition output 305, as highlighted in a dashed lasso in the FIG. 3C.

The treewidth tw(G) of a computation graph G is the minimum width of all tree decomposition outputs, and the width of a tree decomposition output is defined as the maximum bag size minus one, where the bag size of a given bag is based on the number of nodes in the bag. For example, the width of the tree decomposition output 305 is 1. Suppose there are only two more possible tree decomposition outputs from the undirected computation graph 303, one with a width of 2 and another that has a width of 5. Then among the three tree decomposition outputs, the minimum width is 1, that is, the treewidth tw(G) of the computation graph 303 is 1.

In some implementations, the system maintains a width threshold, i.e., a pre-determined threshold value, such that the width for any tree decomposition outputs for the computation graph G are smaller than the width threshold. In other words, the system does not select any tree decomposition output unless the tree has a width less than the tree width.

A separator is a set of nodes that, when removed from the computation graph in a manner that nodes in the separator and edges linked to each node in the separator are removed, separates the remainder of the nodes and edges, i.e., the nodes that are not in the separator and edges that connect only nodes that are not in the separator, of the computation graph such that the remaining nodes and edges form a number of connected component subgraphs of the computation graph. Each connected component subgraph includes a number of nodes connected to each other with edges, but none of the connected component subgraphs are connected to any other connected component subgraphs.

A separator for a tree decomposition is a bag selected from all of the bags in the tree decomposition that, when removed from the tree structure in the manner that nodes in the separator and edges connecting nodes from other bags to nodes in the separator are removed, the remaining bags and edges form a number of connected subtrees.

A balanced separator for a tree decomposition is a separator that, when removed from the tree structure as described above, the remaining bags and edges form a number of connected subtrees with sizes at most half of the original tree size of the tree decomposition.

In some implementations, the system can generate a partition of connected component subgraphs with each component subgraph being much smaller in size than the original graph.

The system can do this, for example, by generating a balanced separator for a tree decomposition of the computation graph, and then removing the balanced separator from the tree decomposition.

Then the system can efficiently generate a schedule for the computation graph by recursively generating a schedule for each connected component subgraph resulting from the partition. The recursion may be repeated until a threshold condition is met. The threshold condition may, for example, be a peak memory requirement for executing the directed or undirected acyclic graph falls below a threshold value corresponding to the available memory for executing the directed or undirected acyclic graph on a particular piece of hardware.

In some implementations, this process can be carried out in parallel for each connected component subgraph. Because of the properties of the partition, each connected component subgraph is independent of one another, i.e., not connected together by any edges, therefore the system can independently generate a schedule for each component subgraph without data dependency issues.

The system can then add each schedule obtained for each subgraph to a valid final schedule.

The system or other devices configured to execute the computation graph can then execute the computation graph according to the final schedule.

Figure 4:
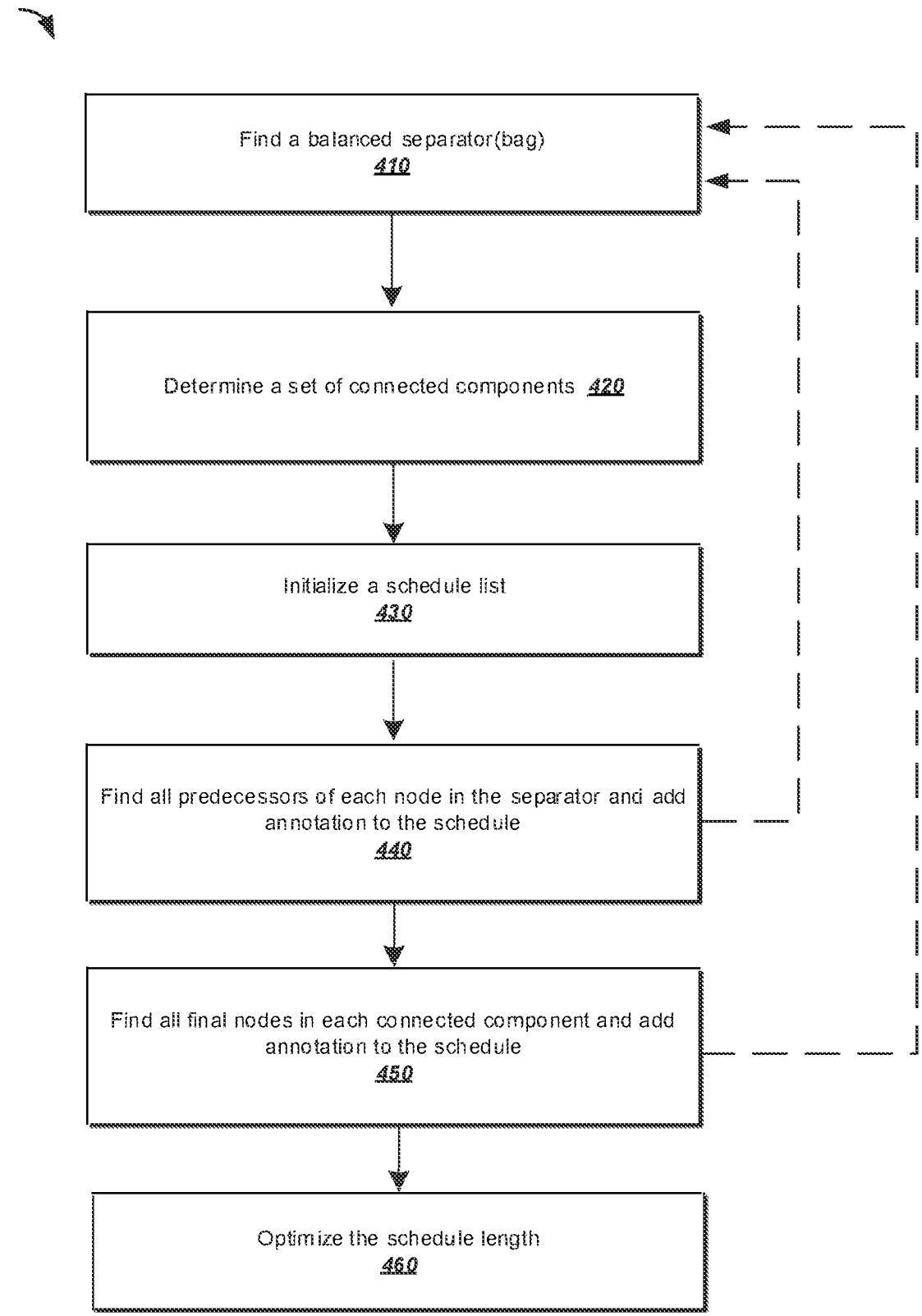
FIG. 4 is a flow diagram of an example process for scheduling operations of computation graph based on tree decomposition.

FIG. 4 illustrates a flow diagram of an example process 400 for scheduling operations of computation graph based on tree decomposition. For convenience, the process 400 will be described as being performed by a system of one or more computers located in one or more locations. For example, an operation scheduling system, e.g., the operation scheduling system 200 of FIG. 2, appropriately programmed, can perform the process 400.

To schedule operations using the process 400, the system takes as input (a) an acyclic computation graph G, and (b) a tree decomposition with (1) a plurality of bags and (2) a tree obtained from the computation graph G through a tree decomposition process. In some implementations, the system takes as input (a) a subset of nodes of a computation graph G as a restriction set, (b) a tree decomposition based on the restriction set, (c) a subset of nodes of the restriction set as a computing set, and (d) the computation graph G. The system outputs a schedule with annotations for all nodes in the computation graph G Each annotation corresponds to a node in the schedule and indicates whether an output of the node is saved in memory. That is, a device that is executing operations of the computation graph according to the schedule can use the annotation for any given node in the schedule to determine whether to store the output of the operation represented by the node in memory or discard it once it has been consumed as input by another operation. In some implementations, adding an annotation to a node can be carried out by defining a scalar variable associated with the node that describes whether to save the output of the node in memory.

The system finds a balanced separator (410) of the computation graph G, as described before. The balanced separator, after removal, can make the remaining bags and edges in the tree decomposition form a set of connected component subgraphs (subtrees) with sizes at most half of the original tree size of the tree decomposition.

The system then determines a set of connected component subgraphs after removing the balanced separator and all nodes associated to the separator from all bags (420). Bags, containing any of the same node(s) from the computation graph G, can form up a connected component subgraph using corresponding tree edges of the tree decomposition. Because of the way that the separator is identified, if a node is in two or more connected component subgraphs, the node must also be in the balanced separator. Hence, it is guaranteed that the remaining nodes and edges can form a set of connected component subgraphs after removing the balanced separator.

Next, the system initializes a schedule list (430). Generally, the schedule list is initialized as an empty set.

After that, the system finds all predecessors of each node in the separator and adds the nodes, optionally with corresponding annotations, to the schedule (440). For example, the system can iterate over the nodes in the separator according to a random order or according to a fixed order when generating the schedule. In particular, for a given node in the separator, the system finds all the immediate predecessors of the node and adds the immediate predecessors with annotation to the schedule, then the system finds all predecessors to the immediate predecessors and adds all predecessors to the immediate predecessors with annotation to the schedule, and finally the system adds the node with annotation to the schedule until all predecessors of the node are found and added to the schedule.

Moreover, the system finds all final nodes in each connected component subgraph and adds them to the schedule (450). All the final nodes are nodes not in the separator, as well as not predecessors to any other nodes. Each final node will also be added, optionally with annotation, to the schedule.

In the end, the system optimizes the schedule length by freeing the unneeded balanced separator nodes (460). The unneeded balanced separator nodes are nodes that are not added to the schedule but originally included in the balanced separator by step 410.

In some implementations, step 440 and 450 can be called recursively based on the divide-and-conquer strategy. For example, when the step 440 is executed for the first time, some internal parameters, such as the restriction set and the computing set, are updated. Then the system calls and executes the same process all over again from step 410 taking as input the updated internal parameters. The updated internal parameters can affect the scope for searching predecessors, and/or keep track of the schedule when the system calls the process recursively. The system stops calling the process recursively when some criteria are met. For example, the criteria can be the input parameters for the last recursive call are not defined. As another example, the criteria may comprise a peak memory requirement for executing the schedule falling below a threshold value, e.g., the available memory for executing the schedule on a particular piece of hardware. Similarly for the step 450, the system recursively calls and executes the same process all over again from step 410. The recursive calls guarantee that the size of the tree decomposition reduces at each recursive call, thus guarantees a valid schedule and each operation is performed at least once.

Figure 5:
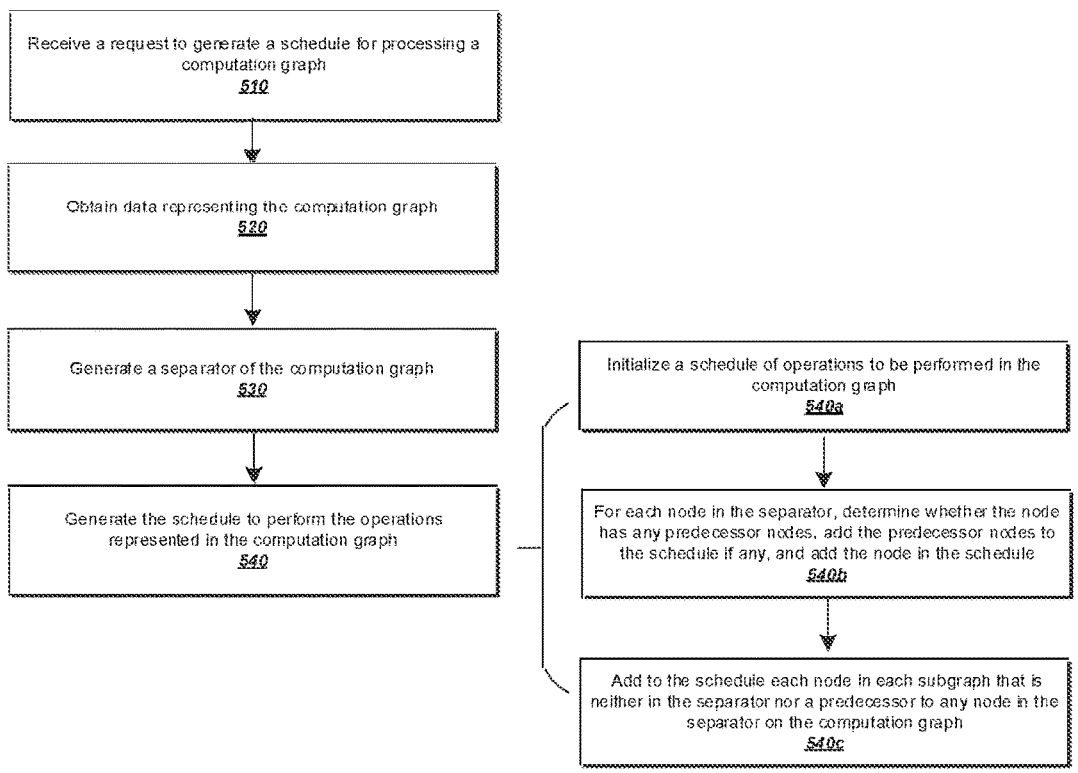
FIG. 5 is a flow diagram of an example process for the operation scheduling system to schedule operations for a computation graph.

FIG. 5 further illustrates a flow diagram of an example process 500 for the operation scheduling system to schedule operations for a computation graph. The process 500 will be described as being performed by a system of one or more computers located in one or more locations. For example, an operation scheduling system, e.g., the operation scheduling system 200 of FIG. 2, appropriately programmed, can perform the process 500.

The operation scheduling system receives a request to generate a schedule for process a computation graph (510), obtains data representing the computation graph (520), generates a separator of the computation graph (530), and then generates the schedule to perform the operations represented in the computation graph (540). To generate the schedule, the system first initializes the schedule of operations to be performed in the computation graph (540*a*), then for each node in the separator, determines whether the node has any predecessor nodes, adds the predecessor nodes to the schedule if any, and adds the node in the schedule (540*b*), and finally adds to the schedule each node in each connected component subgraph that is neither in the separator nor a predecessor to any node in the separator on the computation graph (540*c*). Generating a separator in step 530 is described in more detail above in step 410 of FIG. 4. Adding predecessors for nodes from the separator to the schedule in step 540*b* is described in more detail above in step 440 of FIG. 4. Adding nodes that are neither in the separator nor a predecessor to the schedule is described in more details above in step 450 of FIG. 4.

In some implementations, the system can instead generate a schedule for a computation graph using a path decomposition, i.e., instead of a tree decomposition. In these implementations, the computation graph defines a directed path traversing every node in the computation graph.

A path in a computation graph G is a sequence of distinct nodes in the computation graph such that each pair of consecutive nodes in the sequence has an edge from the graph joining them. A path is said to be a directed path when every pair of nodes in the sequence is connected by a directed edge, with the edge going from the earlier node in the sequence to the node immediately after it in the sequence. In this specification, a directed path traversing every node in a computation graph is also called a long spine for the computation graph. In some implementations, if the computation graph does not include a long spine, the system can modify the computation graph, e.g., by adding nodes and edges, so that the computation defines a long spine.

For a directed acyclic computation graph defining a long spine, the system can generate a schedule to execute the operations based on the long spine of the computation graph. For a directed acyclic computation graph that does not define a long spine, the system can generate a schedule to execute the operations in the graph by first generating a path decomposition for the computation graph. A path decomposition is a particular tree decomposition of a computation graph that specifies (1) a plurality of sets that each comprise one or more nodes of the computation graph (a plurality of bags) and (2) a directed path through each set in the plurality of sets (a tree), but with an additional requirement that the tree defines a path that traverses every bag in the plurality of bags sequentially. The plurality of node sets of the path decomposition are ordered according to the path defined by the path decomposition. For example, define the plurality of bags to be a set of bags X in the path decomposition, e.g., $X=\{X_1, X_2, X_3\}$, where $X_1, X_2, X_3$ represent a respective bag, or a set of nodes in the plurality of sets in the path decomposition, in an order such that the bag $X_1$ precedes the bag $X_2$ in the path, which precedes the bag $X_3$.

In some implementations in which the computation graph does not define a long spine, the system can modify the computation graph to define a long spine such that a path decomposition can still be formed from the computation graph. In some implementations, a long spine can be added to a computation graph while controlling the pathwidth of its path decomposition. Note here that the definition of pathwidth pw(G) of a computation graph G is the minimum width of any path decomposition of the computation graph G, similar to the definition of treewidth tw(G).

Figure 6:
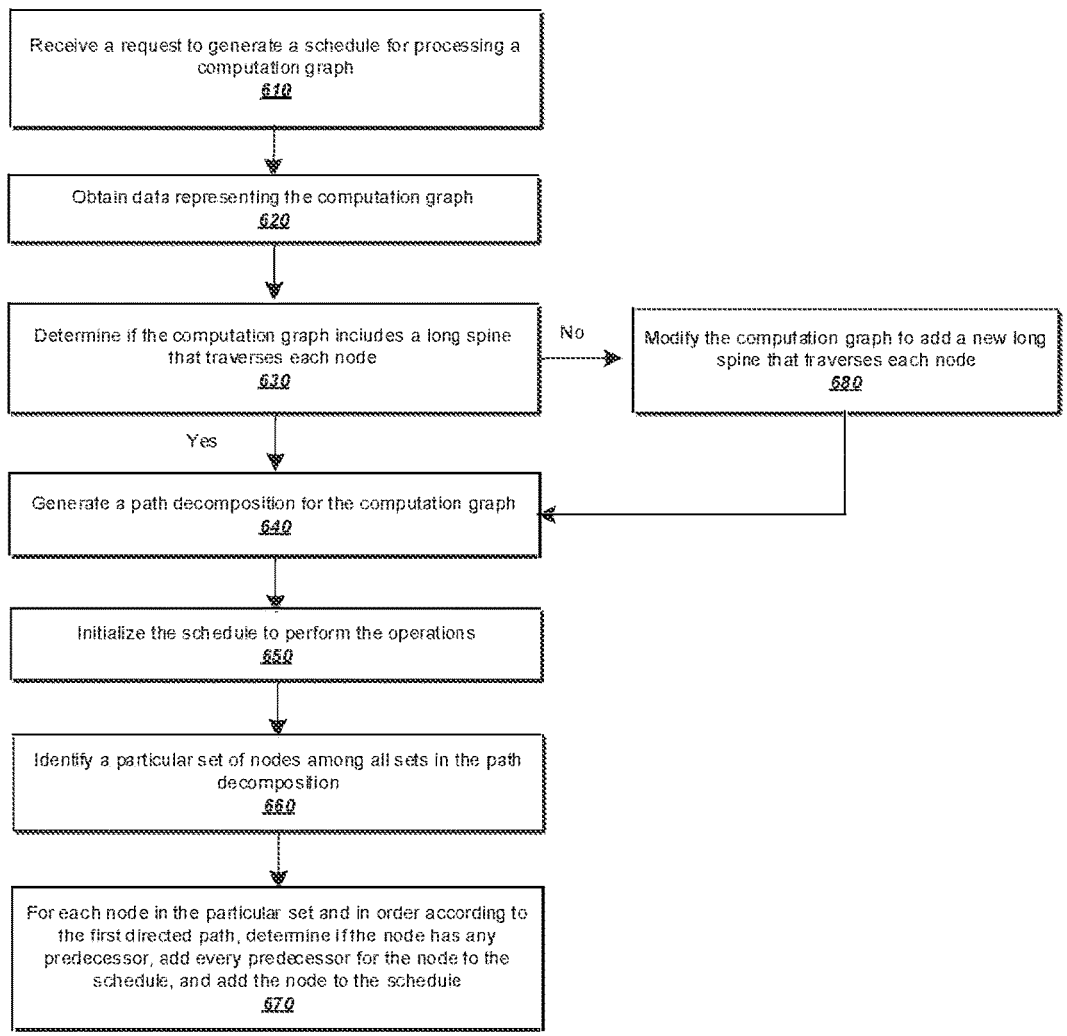
FIG. 6 illustrates an example process of generating a schedule to execute operations in a computation graph based on path decomposition.

FIG. 6 illustrates an example process 600 of generating a schedule to execute operations in a computation graph based on path decomposition. The process 600 will be described as being performed by a system of one or more computers located in one or more locations. For example, an operation scheduling system, e.g., the operation scheduling system 200 of FIG. 2, appropriately programmed, can perform the process 600.

First, the scheduling operation system receives a request to generate a schedule for processing the computation graph (610), the schedule defines a sequence of nodes in the computation graph, and each node represent an operation.

Then the system obtains data that represents the computation graph with a plurality of nodes and directed edges (620). Each directed edge connects a preceding node to a consecutive node that takes as input the output of the preceding node.

Next, the system determines if the computation graph has defined a long spine that traverses each node in the computation graph (630).

If the computation graph has defined a long spine, then the system generates a path decomposition for the computation graph (640), wherein the path decomposition includes (1) a plurality of node sets (a plurality of bags) and (2) a directed path that through each node set in the plurality of node sets.

If the computation graph has not defined a long spine, then the system modifies the computation graph to add a new long spine that traverses each node in the computation graph (680). Adding a long spine to a computation graph while controlling the pathwidth of the path decomposition of the computation graph will be described in more detail below. Once the long spine is added to the computation graph, the system generates a path decomposition for the graph (640) as described above.

Next, the system initializes the schedule to perform the operations in the computation graph (650). For example, the initial schedule can be an empty set with zero nodes.

After that, the system identifies a particular set of nodes, i.e., a bag, from all sets of nodes, i.e., from all of the bags, in the path decomposition (660).

For each node in the particular node set and in order according to the long spine in the computation graph, the system determines if the node has any predecessors, adds every predecessor for the node to the schedule, and finally adds the node to the schedule (670). Adding these nodes to the schedule will be described in more detail below.

As described above, a long spline can be added to a computation graph while controlling the width of its path decomposition. In some implementations, adding long spine to a computation graph only increases the pathwidth of the computation graph by a factor of 2.

Figure 7:
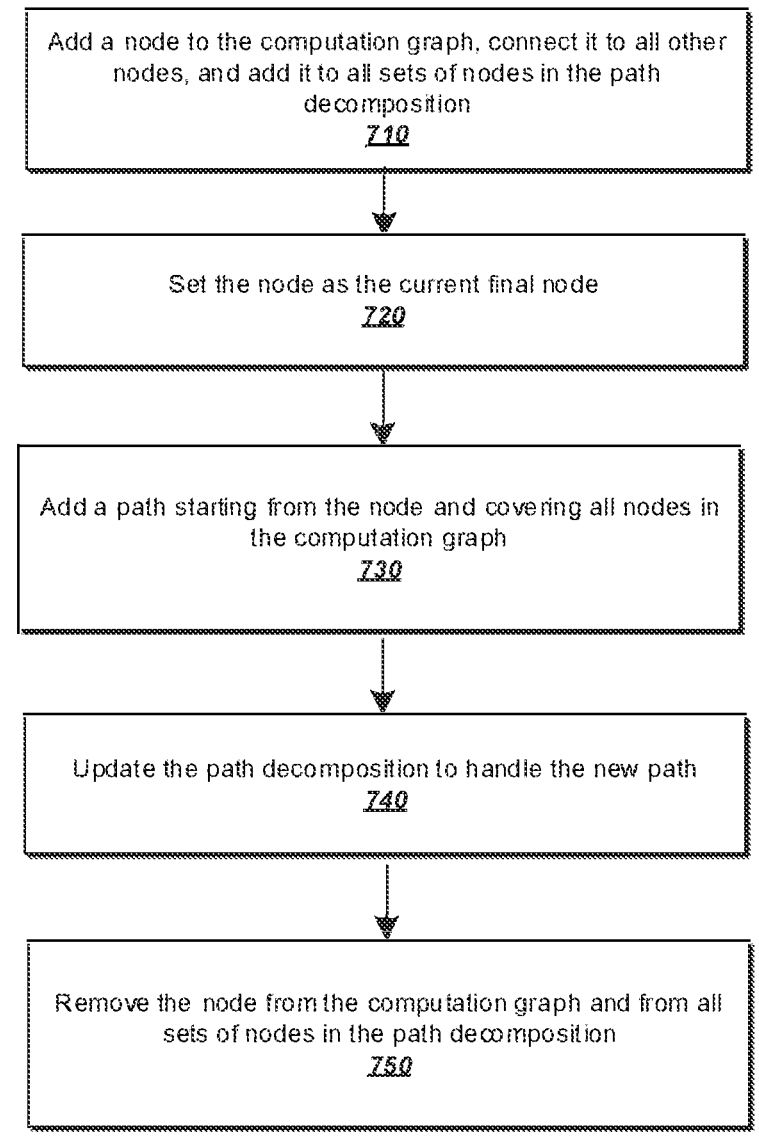
FIG. 7 illustrates an example process to modify a computation graph in order to define a long spine.

FIG. 7 illustrates an example process 700 to modify a computation graph in order to define a long spine to the graph while maintaining a low pathwidth of the computation graph. The process 700 will be described as being performed by a system of one or more computers located in one or more locations. For example, an operation scheduling system, e.g., the operation scheduling system 200 of FIG. 2, appropriately programmed, can perform the process 700.

The system first adds a node u to the computation graph, connects it to all other nodes and adds it to all sets of nodes (all bags) in the path decomposition (710), then the system sets the node u as the current final node of the directed path in the path decomposition (720). In some implementations, the system can be recursively called to obtain the current final node that has no in-neighbors. Note here that nodes in the computational graph are processed in topological order, thus any node is not processed before its in-neighbors have been processed. In-neighbors of a node are nodes connecting to the node in topological order. For example, there must be at least one such in-neighbor node r for the node v in the path decomposition such that when the node r has been processed, node v has no unexplored in-neighbors hence v should then be processed.

Next, the system adds a path starting from the node u to connect with an immediate next node (730). The path should cover all nodes that are processed in a recursive manner. Then the system updates the path decomposition of the computation graph to handle the new path (740), and finally the system removes the node u from the computation graph and from all bags in the updated path decomposition of the graph (750).

The system can rely on structural properties of a path decomposition of a computation graph with a long spine when generating the schedule for the graph. For example, any directed path (e.g., long spine) passing between two sets of nodes (two bags) of the path decomposition must also pass between any intermediate set of nodes (intermediate bags). For another example, each last node of a bag in a path decomposition of a computation graph can be ordered based on (1) the final node of the directed path (e.g., long spine) and (2) the bag that contains the final node.

As another example, given a computation graph that has a path decomposition and one of its subgraphs, removing all the nodes that are not in the subgraph from each bag of the computation graph results in the rest of the path decomposition being a valid path decomposition for the subgraph. By removing the nodes, edges connecting these nodes are also removed. Thus the remaining nodes and edges of the original path decomposition form a valid path decomposition.

As another example, schedules of subgraphs of a computation graph based on path decomposition can be interleaved, and the interleaved schedules of the computation graph can be merged, flattened or condensed together to form a schedule for the computation graph.

The above-mentioned structural properties allow a divide-and-conquer strategy to recursively schedule operations on the right and left sides of the path decomposition. The recursion may be repeated until one or more criteria are met. The criteria may comprise a peak memory requirement for executing the schedule falling below a threshold value, e.g., the available memory for executing the schedule on a particular piece of hardware.

Figure 8:
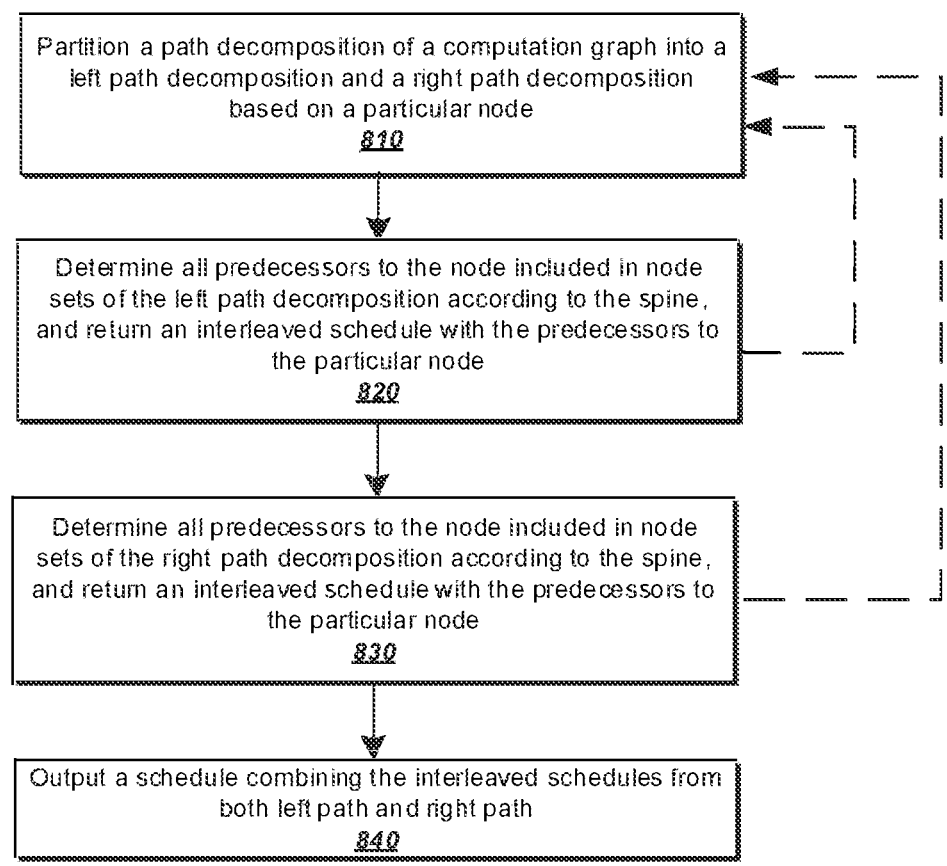
FIG. 8 illustrates an example process for scheduling operations for a computation graph based on path decomposition.

FIG. 8 illustrates an example process 800 for scheduling operations for a computation graph based on path decomposition. The process 800 will be described as being performed by a system of one or more computers located in one or more locations. For example, an operation scheduling system, e.g., the operation scheduling system 200 of FIG. 2, appropriately programmed, can perform the process 800.

The system in FIG. 8 first partitions a path decomposition of a computation graph into a left path decomposition and a right path decomposition (810). The computation graph has defined a long spine that traverses each node in the computation graph in an order. The partition of the path decomposition is based on a particular node in the computation graph. Nodes that are ordered after the particular node in the spine line are removed from each bag in the path decomposition. For example, define a set of the plurality of node sets (e.g., a set of all bags) obtained from a path decomposition as X, where $X(X_1, X_2, \ldots, X_b)$. Define u as a particular node. Then the system removes any nodes in X that are after node u in order according to the long spine to result in a new path decomposition $X'=(X'_1, X'_2, \ldots, X'_b)$. The set of nodes (the bag) that contains the particular node u will separate the new path decomposition X' into a left path decomposition and a right decomposition. For example, if the particular node u is in the bag $X_i'$, the new path decomposition X' is then partitioned into a left path decomposition $X^l=(X'_{i-1}, X'_{i-2}, \ldots, X'_1)$ and a right decomposition $X^r=(X'_{i+1}, X'_{i+2}, \ldots, X'_b)$.

Then, the system, by taking as input the left path decomposition, determines if there is any predecessor for the particular node u in the plurality of node sets of the left path decomposition according to the order of the long spine, and returns an interleaved schedule annotating all predecessors annotated to the particular node u (820). Note here step 810 and step 820 can be called recursively in order to further partition the left path decomposition into smaller sizes, which echoes the divide-and-conquer technology.

Similarly, the system, by taking as input the right path decomposition, determines if there is any predecessor for the particular node u in the plurality of node sets of the right path decomposition according to the order of the long spine, and returns an interleaved schedule annotating all predecessors to the particular node u (830). Again, step 810 and step 830 can be called recursively. In some implementations, step 820 and step 830 can share a same system structure without differentiating between a left or right path decomposition. For example, step 820 and step 830 can be the same system that recursively calls back to step 810.

Finally, the system outputs a schedule for the computation graph through combining interleaved schedules from both the left path decomposition and the right path decomposition (840). To do this, the system can take merge, flatten and/or condense operations to integrate interleaved schedules in to the schedule based on the structural properties of the path decomposition.

As an illustration of integrating interleaved schedules, first define σ as a schedule and u as a node. Then define a concatenation operation $\bigcirc$ such that $\sigma \bigcirc u \bigcirc \sigma'$ stands for the schedule σ is followed by the node u and then followed by the schedule σ'. Define a set of nodes X an interleaved schedule on X is a set of tuples $\{L=\{<\sigma_1, x_1>, <\sigma_2, x_2>, \ldots <\sigma_k, x_k>\}$ such that each $x_i \in X$ and each $\sigma_i$ is a schedule. Then define the merge operation as $$\text{Merge}(L) = \bigcup_i \{<\sigma_i, x_i>\},$$

where $\sigma_i = \sigma_{i1} \bigcirc \sigma_{i2} \bigcirc \ldots$ for each i.

Next, define the flatten operation as $$\text{Flatten}(L) = \sigma_1 \bigcirc x_1 \bigcirc \sigma_2 \bigcirc x_2 \ldots \sigma_k \bigcirc x_k.$$

Let $X' \subseteq X$, and $i_1 < i_2 < \ldots < i_{k'}$ be indices so that $X'=\{x_{i_j}\}$, where $k'$ is the length of the node set $X'$. Define $\tau_i = \sigma_{i_{j-1}+1} \bigcirc x_{i_{j-1}+1} \bigcirc \sigma_{i_{j-1}+2} \bigcirc \sigma_{i_j}$ with $i_1=0$ for convenience. Finally, define the condense operation as:

$$\text{Condense}(X',L) = \bigcup_j \{<\tau_j, x_{i_j}>\}.$$

Moreover, Condense(X', L)=Condense(X',Merge(L)), and Flatten(L)=Flatten(Merge(L))=Flatten(Condense(X', L)).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining, by a system, data representing a computation graph including a plurality of nodes and directed edges, each of the plurality of nodes representing a respective operation to be performed by one or more computing devices;
    receiving, by the system, a request to generate a schedule for processing the computation graph, wherein the schedule defines a sequence of operations represented by the computation graph to be performed by the one or more computing devices according to an ordering;
    generating a particular portion of the computation graph based on performing either tree decomposition or path decomposition, wherein the particular portion (i) includes a separator when tree decomposition is performed, and (ii) includes a bag when path decomposition is performed;
    generating the schedule, comprising:
        initializing the schedule; and
        for each node in the particular portion and according to a particular order defined by the computation graph, adding, to the schedule, (i) all predecessor nodes of the node and (ii) all further predecessor nodes of the all predecessor nodes based on one or more of the directed edges and the node; and
    causing the one or more computing devices to execute the sequence of operations defined by the schedule.

2. The method of claim 1, wherein the computation graph represents operations for processing an input for a neural network.

3. The method of claim 1, wherein the separator is a balanced separator of the tree decomposition when tree decomposition is performed.

4. The method of claim 1, wherein the schedule comprises annotations, each annotation corresponding to a respective node in the schedule and indicating whether an output generated by performing a respective operation corresponding to the respective node is saved in memory.

5. The method of claim 1, wherein generating the particular portion of the computation graph when path decomposition is performed comprises:
- determining that the computation graph includes a first directed path through the computation graph that traverses each node in the computation graph;
- in response to determining that the computation graph includes the first directed path, performing the path decomposition defining (i) a plurality of portions that each comprise one or more nodes of the computation graph and (ii) a second directed path through each portion in the plurality of portions; and
- generating the particular portion that includes the bag from the plurality of portions of the path decomposition.

6. The method of claim 5, further comprising:
- partitioning the path decomposition of the computation graph into a left path decomposition and a right path decomposition, wherein the left path decomposition comprises each portion in the plurality of portions ordered before the particular portion according to the second direct path, and wherein the right path decomposition comprises each portion in the plurality of portions ordered after the particular portion according to the second directed path; and
- wherein adding to the schedule any predecessor nodes of the node based on one or more the directed edges and the node, including:
  - adding, to a left schedule, any predecessor nodes of the node in the left path decomposition based on one or more of the directed edges and the node, and,
  - adding, to a right schedule, any predecessor nodes of the node in the right path decomposition based on one or more of the directed edges.

7. The method of claim 6, further comprising:
- generating the schedule by integrating the left schedule and the right schedule.

8. The method of claim 1, wherein generating the particular portion of the computation graph when path decomposition is performed comprises:
- determining that the computation graph does not include a first directed path through the computation graph that traverses each node in the computation graph;
- in response to determining that the computation graph does not include the first directed path, modifying the computation graph to define a new directed path through each node of the modified computation graph; and
- generating a new path decomposition based on the modified computation graph, the new path decomposition defining (i) a plurality of portions that each comprise one or more nodes of the modified computation graph and (ii) the new directed path through each portion in the plurality of portions, and
- generating the particular portion that includes at least the particular node from the plurality of portions of the modified computation graph.

9. The method of claim 8, wherein modifying the computation graph includes:
- adding a new node to the computation graph;
- connecting the new node to all other nodes in the computation graph;
- generating the new directed path starting from the new node; and
- removing the new node from the computation graph.

10. A system comprising one or more computers and one or more storage devices storing instructions that when executed by the one or more computers cause the one or more computers to perform:
- obtaining, by a system, data representing a computation graph including a plurality of nodes and directed edges, each of the plurality of nodes representing a respective operation to be performed by one or more computing devices;
- receiving, by the system, a request to generate a schedule for processing the computation graph, wherein the schedule defines a sequence of operations represented by the computation graph to be performed by the one or more computing devices according to an ordering;
- generating a particular portion of the computation graph based on performing either tree decomposition or path decomposition, wherein the particular portion (i) includes a separator when tree decomposition is performed, and (ii) includes a bag when path decomposition is performed;
- generating the schedule, comprising:
  - initializing the schedule; and
  - for each node in the particular portion and according to a particular order defined by the computation graph, adding, to the schedule, (i) all predecessor nodes of the node and (ii) all further predecessor nodes of the all predecessor nodes based on one or more of the directed edges and the node; and
- causing the one or more computing devices to execute the sequence of operations defined by the schedule.

11. The system of claim 10, wherein the separator is a balanced separator of the tree decomposition when tree decomposition is performed.

12. The system of claim 10, wherein generating the particular portion of the computation graph when path decomposition is performed comprises:
- determining that the computation graph includes a first directed path through the computation graph that traverses each node in the computation graph;
- in response to determining that the computation graph includes the first directed path, performing the path decomposition defining (i) a plurality of portions that each comprise one or more nodes of the computation graph and (ii) a second directed path through each portion in the plurality of portions; and
- generating the particular portion that includes the bag from the plurality of portions of the path decomposition.

13. The system of claim 10, wherein generating the particular portion of the computation graph when path decomposition is performed comprises:
- determining that the computation graph does not include a first directed path through the computation graph that traverses each node in the computation graph;
- in response to determining that the computation graph does not include the first directed path, modifying the computation graph to define a new directed path through each node of the modified computation graph; and
- generating a new path decomposition based on the modified computation graph, the new path decomposition defining (i) a plurality of portions that each comprise one or more nodes of the modified computation graph and (ii) the new directed path through each portion in the plurality of portions, and generating the particular portion that includes at least the particular node from the plurality of portions of the modified computation graph.

14. One or more non-transitory computer readable storage media storing instructions that, when executed by one or more computers, cause the one or more computers to perform operations, the operations comprising:
   obtaining, by a system, data representing a computation graph including a plurality of nodes and directed edges, each of the plurality of nodes representing a respective operation to be performed by one or more computing devices;
   receiving, by the system, a request to generate a schedule for processing the computation graph, wherein the schedule defines a sequence of operations represented by the computation graph to be performed by the one or more computing devices according to an ordering;
   generating a particular portion of the computation graph based on performing either tree decomposition or path decomposition, wherein the particular portion (i) includes a separator when tree decomposition is performed, and (ii) includes a bag when path decomposition is performed;
   generating the schedule, comprising:
      initializing the schedule; and
      for each node in the particular portion and according to a particular order defined by the computation graph, adding, to the schedule, (i) all predecessor nodes of the node and (ii) all further predecessor nodes of the all predecessor nodes based on one or more of the directed edges and the node; and
   causing the one or more computing devices to execute the sequence of operations defined by the schedule.

15. The one or more non-transitory computer readable storage media of claim 14, wherein separator is a balanced separator of the tree decomposition when tree decomposition is performed.

16. The one or more non-transitory computer readable storage media of claim 14, wherein generating the particular portion of the computation graph when path decomposition is performed comprises:
   determining that the computation graph includes a first directed path through the computation graph that traverses each node in the computation graph;
   in response to determining that the computation graph includes the first directed path, performing the path decomposition defining (i) a plurality of portions that each comprise one or more nodes of the computation graph and (ii) a second directed path through each portion in the plurality of portions; and
   generating the particular portion that includes the bag from the plurality of portions of the path decomposition.

17. The one or more non-transitory computer readable storage media of claim 14, wherein generating the particular portion of the computation graph when path decomposition is performed comprises:
   determining that the computation graph does not include a first directed path through the computation graph that traverses each node in the computation graph;
   in response to determining that the computation graph does not include the first directed path, modifying the computation graph to define a new directed path through each node of the modified computation graph; and
   generating a new path decomposition based on the modified computation graph, the new path decomposition defining (i) a plurality of portions that each comprise one or more nodes of the modified computation graph and (ii) the new directed path through each portion in the plurality of portions, and
   generating the particular portion that includes at least the particular node from the plurality of portions of the modified computation graph.

* * * * *